US010399581B2

(12) United States Patent
Huang et al.

(10) Patent No.: US 10,399,581 B2
(45) Date of Patent: Sep. 3, 2019

(54) DEADHEAD RETURN CONTROL SYSTEM FOR A LOCOMOTIVE OR A CONTROL CAR SIMILAR TO A LOCOMOTIVE

(71) Applicant: Knorr-Bremse Systems For Rail Vehicles (Suzhou) Co., Ltd., Suzhou New District (CN)

(72) Inventors: Zili Huang, Suzhou (CN); Minye Zhang, Suzhou (CN)

(73) Assignee: Knorr-Bremse Systems For Rail Vehicles (Suzhou) Co., Ltd., Suzhou New District (CN)

( * ) Notice: Subject to any disclaimer, the term of this patent is extended or adjusted under 35 U.S.C. 154(b) by 46 days.

(21) Appl. No.: 15/686,609

(22) Filed: Aug. 25, 2017

(65) Prior Publication Data
US 2018/0057026 A1 Mar. 1, 2018

(30) Foreign Application Priority Data
Aug. 31, 2016 (CN) .......................... 2016 1 0780429

(51) Int. Cl.
| | |
|---|---|
| *B60T 7/16* | (2006.01) |
| *B60T 13/66* | (2006.01) |
| *B60T 17/22* | (2006.01) |
| *B61H 11/06* | (2006.01) |
| *B61H 13/00* | (2006.01) |

(52) U.S. Cl.
CPC ............... *B61H 11/06* (2013.01); *B60T 7/16* (2013.01); *B60T 13/665* (2013.01); *B60T 17/228* (2013.01); *B61H 13/00* (2013.01)

(58) Field of Classification Search
CPC .............................. B60T 15/021; B60T 15/027
USPC ............................................. 303/6.01
See application file for complete search history.

(56) References Cited

U.S. PATENT DOCUMENTS

| | | | | |
|---|---|---|---|---|
| 3,525,556 | A * | 8/1970 | Ferguson ............... | B60T 13/665 303/20 |
| 5,020,862 | A * | 6/1991 | Balukin .................. | B60T 7/126 303/15 |
| 5,332,297 | A * | 7/1994 | Cunkelman ........... | B60T 13/665 303/15 |
| 5,730,504 | A * | 3/1998 | Gaughan ............... | B60T 13/665 303/15 |

* cited by examiner

*Primary Examiner* — Robert A. Siconolfi
*Assistant Examiner* — San M Aung
(74) *Attorney, Agent, or Firm* — Bond Schoeneck and King PLLC; David Nocilly

(57) ABSTRACT

A deadhead return control system for a locomotive or a control car similar to a locomotive having a deadhead stop and a piston valve with the connection status of the piston valve being controlled by the status of the deadhead stop. A first end of the deadhead stop is connected to a pilot end of the piston valve, a second end of the deadhead stop is connected to the atmosphere, a third end of the deadhead stop is connected to the external main air pipe. When the deadhead stop has a closed status, the first end of the stop is connected to the second end of the stop and when the stop has an open status, the first end of the stop is connected to the third end of the stop to allow for the air from said main air pipe to flow into the piston valve.

18 Claims, 1 Drawing Sheet

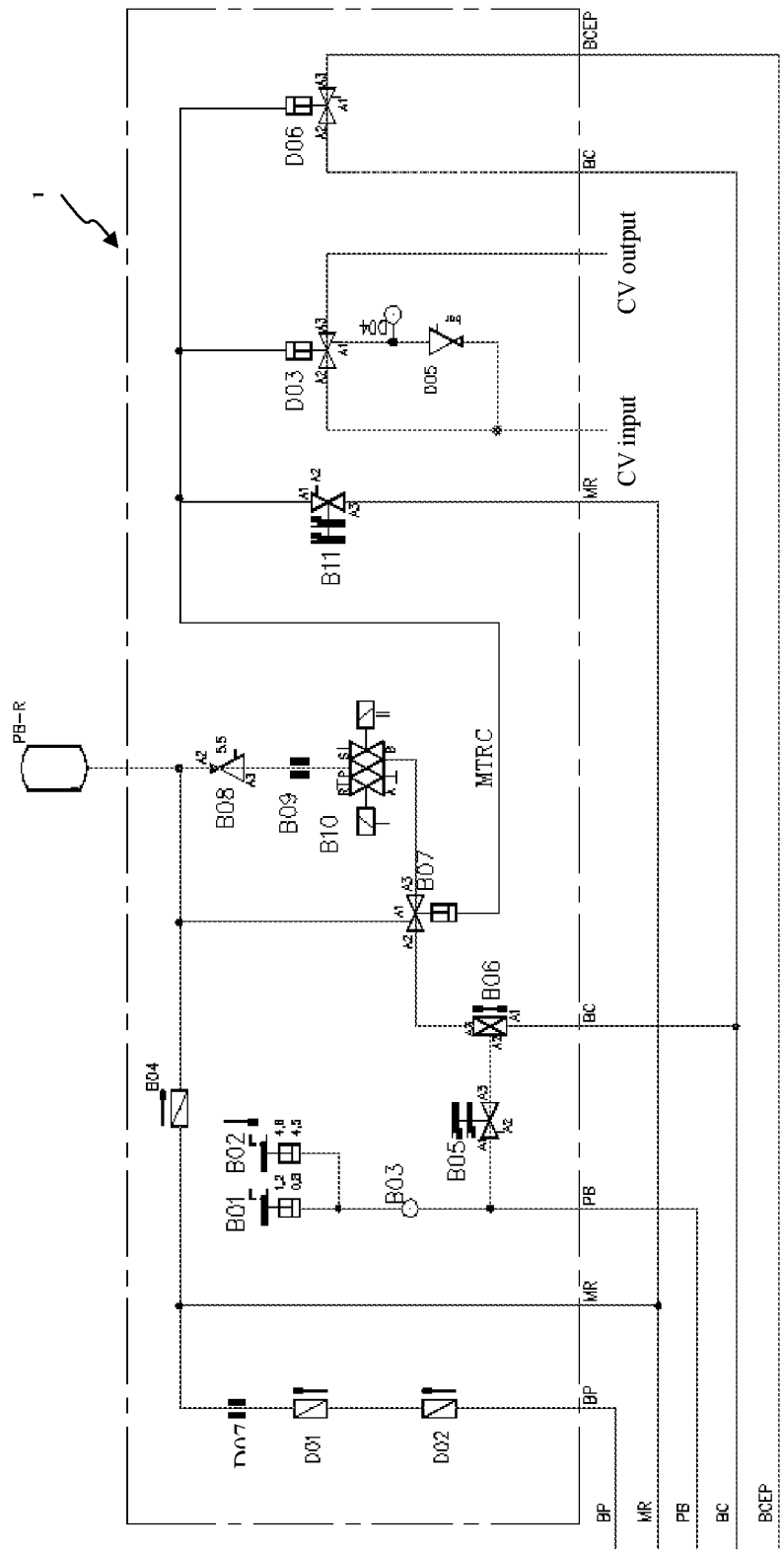

DEADHEAD RETURN CONTROL SYSTEM FOR A LOCOMOTIVE OR A CONTROL CAR SIMILAR TO A LOCOMOTIVE

BACKGROUND OF THE INVENTION

1. Field of the Invention

The present invention relates to a deadhead return control system for a locomotive or a control car similar to a locomotive; it is able to realize the switch between a deadhead return mode and a normal operating mode of a locomotive or a control car similar to a locomotive via one-step operation. The present invention also relates to a locomotive or a control car similar to a locomotive comprising said deadhead return control system.

2. Description of the Related Art

When, for example, a certain locomotive or a control car similar to a locomotive (hereinafter abbreviated as the "Deadhead Return Locomotive") has a failure or needs to be mobilized, it has to be configured to the deadhead status, another locomotive (hereinafter referred to as the "Lead Locomotive") connects with the Deadhead Return Locomotive via the brake pipe, and thus the Lead Locomotive returns the Deadhead Return Locomotive to the repair location for repair or another designated location. This process is called the "locomotive deadhead return."

When a traditionally designed locomotive carries out deadhead return, a plurality of operating steps need to be carried out according to a certain sequence, and there are a lot of operating components. In case of an operator error, for example an incorrect operating sequence or incorrectly operated components, it may result in the error status of relevant brake components and corresponding air pipelines, which may result in serious consequences, such as incomplete release of the parking brake of the Deadhead Return Locomotive. As a result, the Deadhead Return Locomotive may operate with the brake on, which may cause damages to the Deadhead Return Locomotive and rails, and even lead to derailments.

BRIEF SUMMARY OF THE INVENTION

In view of this, the present invention provides a deadhead return control system for a locomotive or a control car similar to a locomotive; it is able to realize the switch between a deadhead return mode and a normal operating mode via one-step operation, and thus avoid potential damages to the locomotive due to operator errors.

To realize the aforementioned purpose, the present invention provides a deadhead return control system for a locomotive or a control car similar to a locomotive, comprising: a deadhead stop, the opening and closing of said deadhead stop corresponding respectively to the deadhead return and normal operating modes of a locomotive or a control car similar to a locomotive, and a piston valve, the connection status of said piston valve being controlled by the open or closed status of said deadhead stop; a first end of said deadhead stop is connected to a pilot end of said piston valve; a second end of said deadhead stop is connected to the atmosphere; a third end of said deadhead stop is connected to the external main air pipe; when said deadhead stop is at the closed status, said first end of said deadhead stop is connected to said second end of said deadhead stop; when said deadhead stop is at the open status, said first end of said deadhead stop is connected to said third end of said deadhead stop to allow for the air from said main air pipe to flow into said piston valve.

The present invention further provides a locomotive or a control car similar to a locomotive comprising said deadhead return control system.

The deadhead return control system of the present invention is able to realize the switch between a deadhead return mode and a normal operating mode of a locomotive or a control car similar to a locomotive via one-step operation, and thus to a great extent avoid potential adverse consequences due to operator errors.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a schematic diagram of a deadhead return control system of an embodiment according to the present invention;

DETAILED DESCRIPTION OF THE INVENTION

The description of various labels in the drawing is as follows:
D01, D02, B04: One-way valve/check valve
D07, B09: Throttle
B01, B02: Pressure switch
B03, D04: Pressure test point
B05, B11: Stop with electrical contacts
B06: Two-way check valve/shuttle valve
B07, D03, D06: Piston valve
B08, D05: Pressure reducing valve
B10: Pulse solenoid valve
PB-R: Parking brake cylinder A deadhead return control system of an embodiment according to the present invention is described below by referencing the attached drawing.

As illustrated in Drawing 1, the deadhead return control system 1 of an embodiment according to the present invention is connected to the external brake pipe (BP), main air pipe (MR), parking brake cylinder pipe (PB), brake cylinder (BC), brake cylinder equalizing pipe (BCEP), and brake cylinder pressure pre-control pipe (CV). Moreover, the deadhead return control system 1 is also connected to the parking brake cylinder (PB-R).

The structures, functions, and operating principles of the brake pipe (BP), main air pipe (MR), parking brake cylinder pipe (PB), brake cylinder (BC), brake cylinder equalizing pipe (BCEP), brake cylinder pressure pre-control pipe (CV), and parking brake cylinder (PB-R) are known, and thus the description of them is omitted. Moreover, in the present Specification, unless specifically pointed out, the so-called "connection" refers to the air connection via pipelines.

The deadhead return control system 1 comprises: Two serially connected one-way valves D01 and D02. The brake pipe (BP) is connected to the internal pipeline of the deadhead return control system 1 via the one-way valves D01 and D02 and throttle D07, and then branches out. One branch is connected to the parking brake cylinder (PB-R) via the one-way valve B04, and the other branch is connected to the external main air pipe (MR) of the deadhead return control system 1. The throttle D07 is used to limit the airflow from the brake pipe BP.

The so-called "one-way valve," also referred to as the "check valve," refers to a valve, which, when the air pressure of the first end of a one-way valve is higher than that of the second end, allows the air to flow from the first end to the second end and, when the air pressure of the second end is higher than that of the first end, prohibits the air from flowing from the second end to the first end.

Thus, when a locomotive or a control car similar to a locomotive operates normally, because the pressure in the main air pipe (MR) is higher than the air pressure in the brake pipe (BP), the air in the main air pipe (MR) will not flow back into the brake pipe (BP) via the one-way valves D01 and D02. On the other hand, during deadhead return of a locomotive or a control car similar to a locomotive, because the air pressure in the main air pipe (MR) cannot be generated on its own and is lower than the air pressure in the brake pipe (BP), the air introduced from the external brake pipe (BP) of the Deadhead Return Locomotive or a control car similar to a locomotive flows into the main air pipe (MR) via the one-way valves D01 and D02.

The deadhead return control system 1 also comprises a deadhead stop B11. According to a specific embodiment, a deadhead stop is a stop with electrical contacts.

The third end A3 of the deadhead stop B11 is connected to the external main air pipe (MR) of the deadhead return control system 1; the second end A2 is connected to the atmosphere; the first end A1 is connected in parallel to the pilot ends of piston valves D03, D06, and B07 via the pipeline MTRC; opening or closing the deadhead stop B11 determines whether there is air supply to the pilot ends of piston valves D03, D06, and B07, and thus determines the connection status of piston valves D03, D06, and B07.

The second end A2 of the piston valve D06 (an example of a third piston valve) is connected to the external brake cylinder (BC) of the deadhead return control system 1 via a known structure; the third end A3 is connected to the external brake cylinder equalizing pipe (BCEP) of the deadhead return control system 1; the first end A1 is connected to the atmosphere.

The second end A2 of the piston valve D03 (an example of a second piston valve) is connected to the input end of the brake cylinder pressure pre-control pipe (CV) of the deadhead return control system 1; the first end A1 is also connected to the input end of the brake cylinder pressure pre-control pipe (CV) via the pressure reducing valve D05 (an example of a pressure reducing apparatus); the third end A3 is connected to the output end of the brake cylinder pressure pre-control pipe (CV) of the deadhead return control system 1. Moreover, it is preferable that a pressure test point D04 is set between the A1 end of the piston valve D03 and the pressure reducing valve D05.

The first end A1 of the piston valve B07 (an example of a first piston valve) is connected to the parking brake cylinder (PB-R); the third end A3 is also connected to the parking brake cylinder (PB-R) via, for example, known control components, for example the pulse solenoid valve B10, throttle B09, and pressure reducing valve B08; the second end A2 is connected to the second inlet end A3 of the two-way check valve B06.

The first inlet end A1 of the two-way check valve B06 is connected to the external brake cylinder (BC) of the deadhead return control system of the locomotive; the outlet end A2 is connected to the third end A3 of the stop B05; the second inlet end A3 of the two-way check valve B06 is connected to the second end A2 of the piston valve B07. The two-way check valve B06 is used for switching between the braking modes of the locomotive (i.e. the A3 end is connected to the A2 end, or the A3 end is connected to the A1 end), that is, under the circumstance that there is pressure in the brake cylinder (BC), a portion of the parking brake pressure will be relieved via B06, avoiding the overlapping of two braking methods, i.e. brake cylinder brake force and parking brake force.

The stop B05, for example, is a stop with electrical contacts; its second end A2 is connected to the atmosphere; one branch of the first end A1 is connected to the external parking brake cylinder pipe (PB) of the deadhead return control system 1 of a locomotive, and the other branch is connected in parallel to the pressure switches B01 and B02 via the pressure test point B03.

The pressure switches B01 and B02 are used for setting off the alarm when the air pressure in the parking brake cylinder pipe (PB) exceeds the pre-determined scope. The stop B05 is used for stopping the parking brake cylinder pipe (PB) (i.e. the A2 end is connected to the A1 end) in case of accidents (for example, the parking tube is seriously leaking or fractured), and is usually (i.e. the A3 end is connected to the A1 end) locked by lead seal.

The operation of the deadhead return control system 1 of the present invention is described as follows.

When a locomotive or a control car similar to a locomotive operates normally, there is air pressure in the main air pipe (MR), and [the air pressure] is higher than the air pressure in the brake pipe (BP); thus, the one-way valves D01 and D02 are closed.

At this time, the deadhead stop B11 is closed. That is, there is no airflow through the A1 end of the deadhead stop B11; the A1 end is connected to the A2 end, which is connected to the atmosphere, so that the pipeline MTRC is connected to the atmosphere.

Thus, there is no airflow through the pilot end of the piston valve D03, and the A2 end is connected to the A3 end, i.e. the air pressure in the brake cylinder pressure pre-control pipe (CV) is not reduced by the pressure reducing valve D05 so that the brake force during the normal operation of a locomotive or a control car similar to a locomotive is output with no pressure reduction.

Moreover, there is no airflow through the pilot end of the piston valve D06, and the A3 end is connected to the A2 end so that the brake cylinder equalizing pipe (BCEP) is connected to the brake cylinder (BC) and the locomotive can brake normally.

Moreover, there is no airflow through the pilot end of the piston valve B07, and the A2 end is connected to the A3 end so that the operator is allowed to inflate the parking brake cylinder (PB-R) via the pulse solenoid valve B10.

On the other hand, during the deadhead return of a locomotive or a control car similar to a locomotive, no air pressure can be generated independently in the main air pipe (MR). When the Lead Locomotive supplies air to the Deadhead Return Locomotive via the connection between the brake pipe (BP) and Deadhead Return Locomotive, because the air pressure in the brake pipe (BP) is greater than the air pressure in the main air pipe (MR), the one-way valves D01 and D02 are opened, and the air in the brake pipe (BP) flows into the main air pipe (MR).

Subsequently, the operator opens the deadhead stop B11 so that the A1 end of the deadhead stop B11 is connected to the A3 end, and the air in the main air pipe (MR) flows into the pipeline MTRC.

Because the air flows into the pilot end of the piston valve D03, the connection status of the piston valve D03 changes; the A1 end is connected to the A3 end, i.e. the air pressure in the brake cylinder pressure pre-control pipe (CV) is reduced by the pressure reducing valve D05 so that during the deadhead return, a locomotive or a control car similar to a locomotive limits the brake force to a relatively low pressure value by the pressure reducing valve D05 according to the railway's operating requirements.

Moreover, since the air flows into the pilot end of the piston valve D06, the connection status of the piston valve D06 changes; the A3 end is connected to the A1 end so that the brake cylinder equalizing pipe BCEP is connected to the atmosphere, removing residual pressure therein and preventing the locomotive or the control car similar to a locomotive from having the brake force applied mistakenly during the deadhead return.

Moreover, since the air flows into the pilot end of the piston valve B07, the connection status of the piston valve B07 changes; the A2 end is connected to the A1 end so that the control component, for example the pulse solenoid valve B10, is shorted in order to prevent adverse consequences created by operator errors on the pulse solenoid valve B10. At the same time, the air flows from the A1 end of the piston valve B07 via the A2 end, two-way check valve B06, and stop B05 into the parking brake cylinder pipe (PB).

The effects of the deadhead return control system 1 of the present invention are described as follows.

During the deadhead return of a locomotive or a control car similar to a locomotive, with regard to the deadhead return control system 1 according to the present invention, one only needs to operate (open) the deadhead stop B11; no other operating step is required, nor is operating other components required. Thus, compared with the structure wherein during deadhead return in the past, a plurality of operating steps need to be operated according to a certain sequence and a plurality of components need to be operated in a locomotive or a control car similar to a locomotive, the number of operating steps and the number of operating components are both reduced to only one, i.e. one-step operation, which thus greatly reduces the possibility of operator errors.

Moreover, the brake pipe (BP) is connected to the deadhead return control system 1 via one-way valves D01 and D02. Thus, compared with the previous structure wherein the brake pipe (BP) is connected to the deadhead return control system via the stop, without requiring manual operation, it can be realized whereby during normal operation, air is prevented from flowing from the main air pipe (MR) back to the brake pipe (BP), and during deadhead return, the air in the brake pipe (BP) automatically flows into the main air pipe (MR).

Moreover, there are a plurality of one-way valves such as D01 and D02 (two in the aforementioned embodiment); such redundant design ensures that the deadhead return control system 1 works normally even if some one-way valves fail.

Moreover, the deadhead return control system 1 comprises a piston valve B07. The A1 end of the piston valve B07 is directly connected to the parking brake cylinder (PB-R), and the A3 end is connected to the parking brake cylinder (PB-R) via the known pulse solenoid valve B10. Opening or closing the deadhead stop B11 can switch the connection between the A2 end of the piston valve B07 and the A1 end or A3 end. Thus, during the deadhead return of a locomotive or a control car similar to a locomotive, the pulse solenoid valve B10 is shorted to prevent potential adverse consequences due to operator errors on the pulse solenoid valve B10.

The present invention has been described by the specific embodiment above. However, the present invention shall not be limited to the aforementioned embodiment. Those of ordinary skill in the art should know that without departing from the scope of the spirit of the present invention, the present invention may be changed in a variety of forms.

For example, in the aforementioned embodiment, the deadhead stop B11 controls the status of the piston valves D03, D06, and B07. However, the present invention is not limited to this. The deadhead stop B11 can also control other components, which require operation, during the deadhead return of a locomotive.

For example, in the aforementioned embodiment, the deadhead stop B11 controls the piston valves D03, D06, and B07. However, the present invention is not limited to this. One or a plurality of the piston valves D03, D06, and B07 may be valves of other categories, as long as they can be controlled by the deadhead stop B11 to change their status.

For example, in the aforementioned embodiment, the quantity of one-way valves is two. However, the present invention is not limited to this. The quantity of one-way valves may also be one or more than three.

What is claimed is:

1. A deadhead return control system for a locomotive or a control car similar to a locomotive, comprising:
    a deadhead stop having an open status and a closed status, the opening and closing of said deadhead stop corresponding respectively to a deadhead return mode and a normal operating mode of a locomotive or a control car similar to a locomotive;
    a piston valve interconnected to said deadhead stop, the connection status of said piston valve being controlled by the open or closed status of said deadhead stop;
    a first end of said deadhead stop is connected to a pilot end of said piston valve;
    a second end of said deadhead stop is connected to atmosphere;
    a third end of said deadhead stop is connected to an external main air pipe;
    when said deadhead stop is at the closed status, said first end of said deadhead stop is connected to said second end of said deadhead stop; and
    when said deadhead stop is at the open status, said first end of said deadhead stop is connected to said third end of said deadhead stop to allow air from said main air pipe to flow into said piston valve.

2. The deadhead return control system of claim 1, further comprising a one-way valve having an inlet end connected to an external brake pipe and an outlet end connected to an external main air pipe.

3. The deadhead return control system of claim 2, further comprising a plurality of serially connected one-way valves.

4. The deadhead return control system of claim 2, wherein said outlet end of said one-way valve is also connected to an external parking brake cylinder.

5. The deadhead return control system of claim 1, wherein a first end of said piston valve is directly connected to an external parking brake cylinder, a second end of said first piston valve is connected to an external parking brake cylinder pipe or brake cylinder, a third end of said first piston valve is connected to a component, which is connected to said parking brake cylinder;
    wherein when said deadhead stop is at the closed status, said second end of said piston valve is connected to said third end of said piston valve, and when said deadhead stop is at the open status, said second end of said piston valve is connected to said first end of said piston valve.

6. The deadhead return control system of claim 5, further comprising a two-way check valve, wherein a first inlet end of said two-way check valve is connected to an external brake cylinder, an outlet end is connected to an external parking brake cylinder pipe, and a second inlet end is connected with the second end of said first piston valve.

7. The deadhead return control system of claim 5, wherein said third end of said piston valve is connected to a pulse solenoid valve, and said pulse solenoid valve is connected to said parking brake cylinder via a throttle and a pressure reducing valve.

8. The deadhead return control system of claim 1, further comprising:
- a second piston valve wherein a first end of said second piston valve is connected to an input end of an external brake cylinder pressure pre-control pipe via a pressure reducing apparatus, a second end of said second piston valve is directly connected to an input end of said external brake cylinder pressure pre-control pipe, and a third end of said second piston valve is connected to an output end of said external brake cylinder pressure pre-control pipe;
- wherein when said deadhead stop is at the closed status, said second end of said second piston valve is connected to said third end of said second piston valve;
- wherein when said deadhead stop is at the open status, said first end of said second piston valve is connected to said third end of said second piston valve.

9. The deadhead return control system of claim 1, further comprising:
- a third piston valve wherein a first end of said third piston valve is connected to the atmosphere, a second end of said third piston valve is directly connected to an external brake cylinder, and a third end of said third piston valve is connected to an external brake cylinder pilot pipe;
- wherein when said deadhead stop is at the closed status, said third end of said third piston valve is connected to said second end of said third piston valve;
- wherein when said deadhead stop is at the open status, said third end of said third piston valve is connected to said first end of said third piston valve.

10. A locomotive or a control car similar to a locomotive, comprising:
- a deadhead return control system including
- a deadhead stop having an open status and a closed status, the opening and closing of said deadhead stop corresponding respectively to a deadhead return mode and a normal operating mode of a locomotive or a control car similar to a locomotive;
- a piston valve interconnected to said deadhead stop, the connection status of said piston valve being controlled by the open or closed status of said deadhead stop;
- a first end of said deadhead stop is connected to a pilot end of said piston valve;
- a second end of said deadhead stop is connected to atmosphere;
- a third end of said deadhead stop is connected to an external main air pipe;
- when said deadhead stop is at the closed status, said first end of said deadhead stop is connected to said second end of said deadhead stop; and
- when said deadhead stop is at the open status, said first end of said deadhead stop is connected to said third end of said deadhead stop to allow air from said main air pipe to flow into said piston valve.

11. The deadhead return control system of claim 10, further comprising a one-way valve having an inlet end connected to an external brake pipe and an outlet end connected to an external main air pipe.

12. The deadhead return control system of claim 11, further comprising a plurality of serially connected one-way valves.

13. The deadhead return control system of claim 11, wherein said outlet end of said one-way valve is also connected to an external parking brake cylinder.

14. The deadhead return control system of claim 10, wherein a first end of said piston valve is directly connected to an external parking brake cylinder, a second end of said first piston valve is connected to an external parking brake cylinder pipe or brake cylinder, a third end of said first piston valve is connected to a component, which is connected to said parking brake cylinder;
- wherein when said deadhead stop is at the closed status, said second end of said piston valve is connected to said third end of said piston valve, and when said deadhead stop is at the open status, said second end of said piston valve is connected to said first end of said piston valve.

15. The deadhead return control system of claim 14, further comprising a two-way check valve, wherein a first inlet end of said two-way check valve is connected to an external brake cylinder, an outlet end is connected to an external parking brake cylinder pipe, and a second inlet end is connected with the second end of said first piston valve.

16. The deadhead return control system of claim 14, wherein said third end of said piston valve is connected to a pulse solenoid valve, and said pulse solenoid valve is connected to said parking brake cylinder via a throttle and a pressure reducing valve.

17. The deadhead return control system of claim 10, further comprising:
- a second piston valve, wherein a first end of said second piston valve is connected to an input end of an external brake cylinder pressure pre-control pipe via a pressure reducing apparatus, a second end of said second piston valve is directly connected to an input end of said external brake cylinder pressure pre-control pipe, and a third end of said second piston valve is connected to an output end of said external brake cylinder pressure pre-control pipe;
- wherein when said deadhead stop is at the closed status, said second end of said second piston valve is connected to said third end of said second piston valve;
- wherein when said deadhead stop is at the open status, said first end of said second piston valve is connected to said third end of said second piston valve.

18. The deadhead return control system of claim 17, further comprising:
- a third piston valve wherein a first end of said third piston valve is connected to the atmosphere, a second end of said third piston valve is directly connected to an external brake cylinder, and a third end of said third piston valve is connected to an external brake cylinder pilot pipe;
- wherein when said deadhead stop is at the closed status, said third end of said third piston valve is connected to said second end of said third piston valve;
- wherein when said deadhead stop is at the open status, said third end of said third piston valve is connected to said first end of said third piston valve.

* * * * *